(12) United States Patent
Hancu et al.

(10) Patent No.: US 8,459,010 B2
(45) Date of Patent: Jun. 11, 2013

(54) SYSTEM AND METHOD FOR CONTROLLING NITROUS OXIDE EMISSIONS OF AN INTERNAL COMBUSTION ENGINE AND REGENERATION OF AN EXHAUST TREATMENT DEVICE

(75) Inventors: Dan Hancu, Clifton Park, NY (US); Larry Neil Lewis, Scotia, NY (US); Benjamin Hale Winkler, Albany, NY (US); Daniel George Norton, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 338 days.

(21) Appl. No.: 12/713,617

(22) Filed: Feb. 26, 2010

(65) Prior Publication Data
US 2011/0209459 A1    Sep. 1, 2011

(51) Int. Cl.
*F01N 3/035* (2006.01)

(52) U.S. Cl.
USPC .......... 60/286; 60/274; 60/276; 60/295; 60/297; 60/300; 60/301; 60/303; 60/311

(58) Field of Classification Search
USPC .......... 60/274, 276, 286, 295, 297, 300, 60/301, 303, 311
See application file for complete search history.

(56) References Cited

U.S. PATENT DOCUMENTS

| | | | |
|---|---|---|---|
| 6,199,373 B1 | 3/2001 | Hepburn et al. | |
| 6,703,343 B2 | 3/2004 | Park | |
| 6,706,660 B2 | 3/2004 | Park | |
| 6,973,775 B2 | 12/2005 | Hoffmann et al. | |
| 7,036,489 B1 | 5/2006 | Wu et al. | |
| 7,181,907 B2 | 2/2007 | Schaller | |
| 7,412,823 B2 | 8/2008 | Reuter et al. | |
| 7,886,521 B2* | 2/2011 | Yokoyama et al. | 60/277 |
| 2003/0106306 A1* | 6/2003 | Nakatani et al. | 60/288 |
| 2005/0072141 A1* | 4/2005 | Kitahara | 60/297 |
| 2005/0086933 A1* | 4/2005 | Nieuwstadt et al. | 60/297 |
| 2006/0021332 A1* | 2/2006 | Gaiser | 60/286 |
| 2007/0073467 A1 | 3/2007 | Hill et al. | |
| 2007/0175208 A1* | 8/2007 | Bandl-Konrad et al. | 60/286 |
| 2008/0022661 A1* | 1/2008 | Yan | 60/286 |
| 2008/0083215 A1 | 4/2008 | Yan | |

(Continued)

FOREIGN PATENT DOCUMENTS
EP    1760282 A1    3/2007

OTHER PUBLICATIONS

PCT/US2010/059008 Search Report and Written Opinion, Feb. 14, 2011.

*Primary Examiner* — Thomas Denion
*Assistant Examiner* — Jorge Leon, Jr.
(74) *Attorney, Agent, or Firm* — Marie-Claire B. Maple

(57) ABSTRACT

A catalyst composition is provided that includes a catalytic metal secured to a substrate, and the substrate is mesoporous and has pores that are templated. A catalyst composition includes a catalytic metal secured to a mesoporous substrate. The mesoporous substrate is a reaction product of a reactive solution, a solvent, a modifier, and a templating agent. A method for controlling nitrous oxide emissions including the catalyst composition comprising introducing a regeneration fuel into an exhaust stream upstream relative to the catalyst composition and heating the exhaust stream upstream relative to the catalyst composition. When the regeneration fuel is introduced the air/fuel ratio $\lambda$ of an air/fuel mixture of a lean burn exhaust is greater than 1.

34 Claims, 9 Drawing Sheets

U.S. PATENT DOCUMENTS

| | | | |
|---|---|---|---|
| 2008/0141663 A1* | 6/2008 | Ono | 60/311 |
| 2008/0306674 A1 | 12/2008 | Hill et al. | |
| 2009/0074641 A1* | 3/2009 | Lewis et al. | 423/213.2 |
| 2009/0107118 A1* | 4/2009 | Ruona | 60/286 |
| 2009/0158715 A1 | 6/2009 | Stroh et al. | |
| 2010/0043404 A1* | 2/2010 | Hebbale et al. | 60/286 |
| 2010/0196237 A1* | 8/2010 | Yin et al. | 423/239.1 |
| 2010/0307140 A1* | 12/2010 | Viola et al. | 60/286 |
| 2010/0319324 A1* | 12/2010 | Mital | 60/286 |
| 2011/0146246 A1* | 6/2011 | Farman et al. | 60/286 |
| 2011/0146270 A1* | 6/2011 | Guo et al. | 60/603 |

* cited by examiner

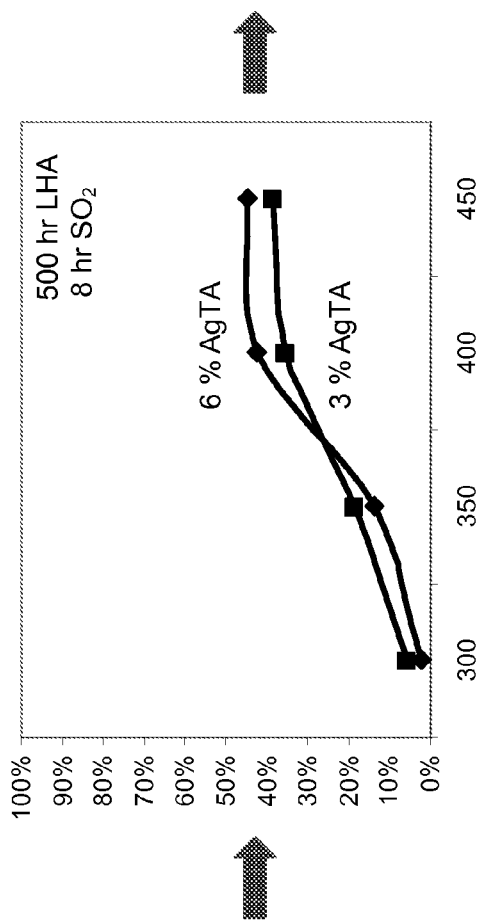
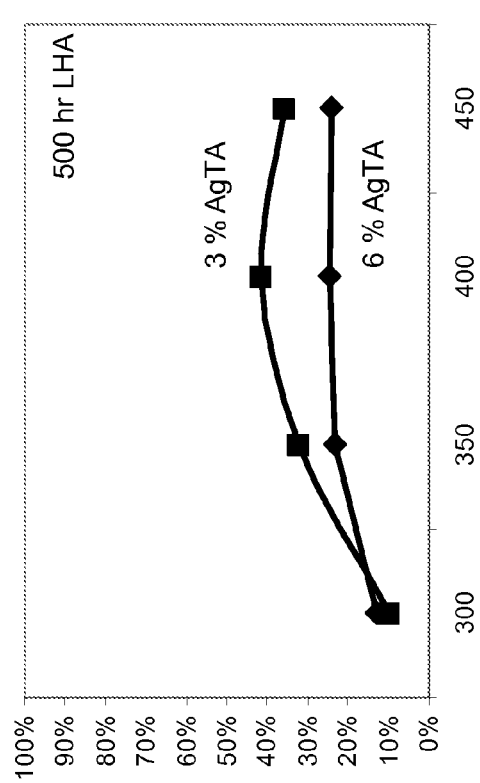
FIG. 7A
FIG. 7B

SYSTEM AND METHOD FOR CONTROLLING NITROUS OXIDE EMISSIONS OF AN INTERNAL COMBUSTION ENGINE AND REGENERATION OF AN EXHAUST TREATMENT DEVICE

BACKGROUND OF THE INVENTION

This invention includes embodiments that may relate to catalysts. This invention includes embodiments that may relate to methods of making catalysts. This invention includes embodiments that may relate to articles that include catalysts.

Exhaust gas streams may contain nitrogen oxides (NOx), unburned hydrocarbons (HC), and carbon monoxide (CO). It may be sometimes desirable to control and/or reduce the amount of one or more of the exhaust gas stream constituents. NOx is thermodynamically unstable but does not spontaneously decompose in the absence of a catalyst. Exhaust gas streams may employ exhaust treatment devices including a catalyst to remove NOx from the exhaust gas stream.

Examples of exhaust treatment devices include: catalytic converters, evaporative emissions devices, scrubbing devices, particulate filters/traps, adsorbers/absorbers, and plasma reactors. Catalytic converters may include three-way catalysts, oxidation catalysts, selective catalytic reduction (SCR) catalysts, and the like. Scrubbing devices may remove hydrocarbon (HC), sulfur, and the like. Plasma reactors may include non-thermal plasma reactors and thermal plasma reactors.

Three way catalysts (TWC) deployed in catalytic converters may facilitate the reduction of NOx using CO and residual hydrocarbons. TWC may be effective over a specific operating range of both lean and rich fuel/air conditions and in a specific operating temperature range. This purification of the exhaust gas stream by the catalytic converter depends on the exhaust gas temperature. The catalytic converter works optimally at an elevated catalyst temperature, at or above about 300° C. The time period between when the exhaust emissions begin (i.e., "cold start"), until the time when the catalyst heats up to a light-off temperature, may be referred to as the light-off time. Light-off temperature is the catalyst temperature at which fifty percent (50 percent) of the emissions from the engine are being converted as they pass through the catalyst.

One method of heating the catalytic converter is to heat the catalyst by contact with high temperature exhaust gases from the engine. This heating, in conjunction with the exothermic nature of the oxidation reactions occurring at the catalyst, will bring the catalyst to light-off temperature. However, until the light-off temperature is reached, the exhaust gases pass through the catalytic converter relatively unchanged. In addition, the composition of the engine exhaust gas changes as the engine temperature increases from a cold start temperature to an operating temperature, and the TWC is designed to work best with the exhaust gas composition that is present at normal elevated engine operating temperatures.

Selective Catalytic Reduction (SCR) may use ammonia that is injected into the exhaust gas stream to react with NOx over a catalyst to form nitrogen and water. Three types of catalysts have been used, including base metal systems, noble metal systems and zeolite systems. The noble metal catalysts operate in a low temperature regime (240° C. to 270° C.), but are inhibited by the presence of $SO_2$. The base metal catalysts, such as vanadium pentoxide and titanium dioxide, operate in the intermediate temperature range (310° C. to 400° C.), but at high temperatures they tend to promote oxidation of $SO_2$ to $SO_3$. The zeolites can withstand temperatures up to 600° C. and, when impregnated with a base metal, have an even wider range of operating temperatures.

Selective Catalytic Reduction with hydrocarbons reduces NOx emissions. Organic compounds can selectively reduce NOx over a catalyst under excess $O_2$ conditions. However, the conversion efficiency was reduced outside the temperature range of 300° C. to 400° C.

It may be desirable to have catalysts that can effect NOx reduction across a wide range of temperatures and operating conditions. It may be desirable to have a catalyst that can effect NOx reduction using unmodified diesel or other hydrocarbon reductants that on the average have less than 4 carbon atoms per molecule. It may be desirable if the method and apparatus could be implemented on existing engines and did not use large inventories of chemicals.

Selective Catalytic Reducing agents for catalytic converters are used to reduce NOx emissions for lean burning engines. Lean burn engines, for example some diesel engines, operate at higher air to fuel ratios which can be as high as 65:1 (or as low as 12:1), as compared to conventional engine fuels that have air/fuel ratio of 14:7 for stoichiometric conditions. The composition of the air/fuel mixture is described by the air/fuel ratio of λ normalized to stoichiometric conditions. In the case of rich mode, rich air/fuel mixture or an air deficiency, the λ is less than 1; and, in the case of a lean burn mode, lean air/fuel mixture or an excess of air the λ is greater than 1.

A drawback to the lean burn engines is that they produce higher concentrations of NOx. Accordingly, catalytic converters are provided such as the SCR's. However, sulfur dioxide emitted by the lean burn engines is oxidized on the metal catalyst of the converter producing sulfur trioxides which in turn form sulfates in the presence of water (in the form of vapor) in the exhaust. These sulfates are thermally stable and compete with the storage of NOx at the converter. Accordingly, the capacity of the catalyst in storing nitrogen oxide is reduced.

It is known to regenerate the catalyst through desulfation processes in which the catalyst is subjected to reducing conditions under a "rich" air/fuel mixture. In addition, the temperature of the exhaust gas or stream from the engine is increased in order to heat the catalyst. Typically, the temperature of exhaust from an engine ranges from about 200° C. to 400° C. under typical operating conditions. Desulfation typically requires temperatures of at least 600° C. The engine may be operated between lean and rich modes/phases with the result that hydrogen $(H_2)$, carbon monoxide (CO) and unburned hydrocarbons (HC) are present in the exhaust gas as reducing agents. In this manner, sulfur species deposited on the catalyst are oxidized and expelled from the catalyst.

BRIEF DESCRIPTION OF THE INVENTION

In one embodiment, a catalyst composition is provided that includes a catalytic metal secured to a substrate, and the substrate is mesoporous and has pores that are templated.

In one embodiment, a catalyst composition includes a catalytic metal secured to a mesoporous substrate. The mesoporous substrate is a reaction product of a reactive solution, a solvent, a modifier, and a templating agent.

In one embodiment, a method includes reacting a reactive solution and a templating agent to form a gel; and calcining the gel to form a substrate having a mesoporous template that is able to support a catalyst composition.

In an embodiment, a method of controlling nitrous oxide emissions in the exhaust emitted from an internal combustion engine that operates using fuel with a lean air/fuel mixture and produces a lean air/fuel mixture in the exhaust having an air ratio λ greater than 1. The method comprises providing a catalytic converter comprising a catalytic metal secured to a substrate that has templated pores within an exhaust stream produced by the internal combustion engine, wherein sulfur species from the exhaust deposit on the catalytic converter. In addition, the method comprises introducing into the exhaust stream, upstream from the catalytic converter a predetermined amount of a regeneration fuel for a resident time period in order to oxidize the sulfur species and de-sulfate the catalytic converter wherein the air ratio λ of the exhaust lean air/fuel mixture does not drop below 1 after introduction of the regenerating fuel; and, heating the exhaust upstream relative to the catalytic converter to a temperature above a range of exhaust temperatures over which the internal combustion operates thereby heating the catalytic metal and the substrate.

The method may also comprise providing a diesel particulate filter between the engine and the catalytic converter and heating the exhaust stream upstream relative to the diesel particulate filter so the regeneration of the filter and desulfation of the converter may be performed simultaneously.

An embodiment of the invention also encompasses a system for controlling nitrous oxide emissions exhausted from a lean burn internal combustion engine that produces a lean air/fuel mixture in the exhaust having an air ratio λ is greater than 1. The system may comprise—a catalytic converter having a catalytic metal secured to a substrate that has templated pores that is positioned within an exhaust stream produced by the internal combustion engine and the catalytic converter is positioned downstream relative to the internal combustion engine and wherein sulfur species from the exhaust deposit on the catalytic converter. An injector mechanism, for introducing a regeneration fuel into the exhaust stream, is positioned upstream relative to the catalytic converter to oxidize the sulfur species and de-sulfate the catalytic converter wherein the air ratio λ of the exhaust lean air/fuel mixture does not drop below 1 after introduction of the regenerating fuel. The system also comprises a heat source positioned upstream relative to the catalytic converter that is activated when the injector mechanism is introducing the regeneration fuel into the exhaust stream to heat the temperature of the exhaust stream above a range of exhaust temperatures over which the internal combustion engine operates thereby heating the catalytic metal and the substrate.

An embodiment of the invention for the system may also include a diesel particulate filter positioned in the exhaust stream between the engine and the catalytic converter. In addition, a heat source may be positioned upstream relative to the filter to heat the filter to actively regenerate the filter while the catalytic converter simultaneously undergoes a desulfation procedure.

BRIEF DESCRIPTION OF DRAWINGS

FIG. 7A is a graph comparing the NOx conversion of hydrothermally aged 3% and 6% AgTA catalytic compositions with ULSD;

FIG. 7B is a graph comparing the NOx conversion of hydrothermally and $SO_2$ (for 8 hours) aged 3% and 6% AgTA catalytic compositions with ULSD;

DETAILED DESCRIPTION OF THE INVENTION

Figure 1:
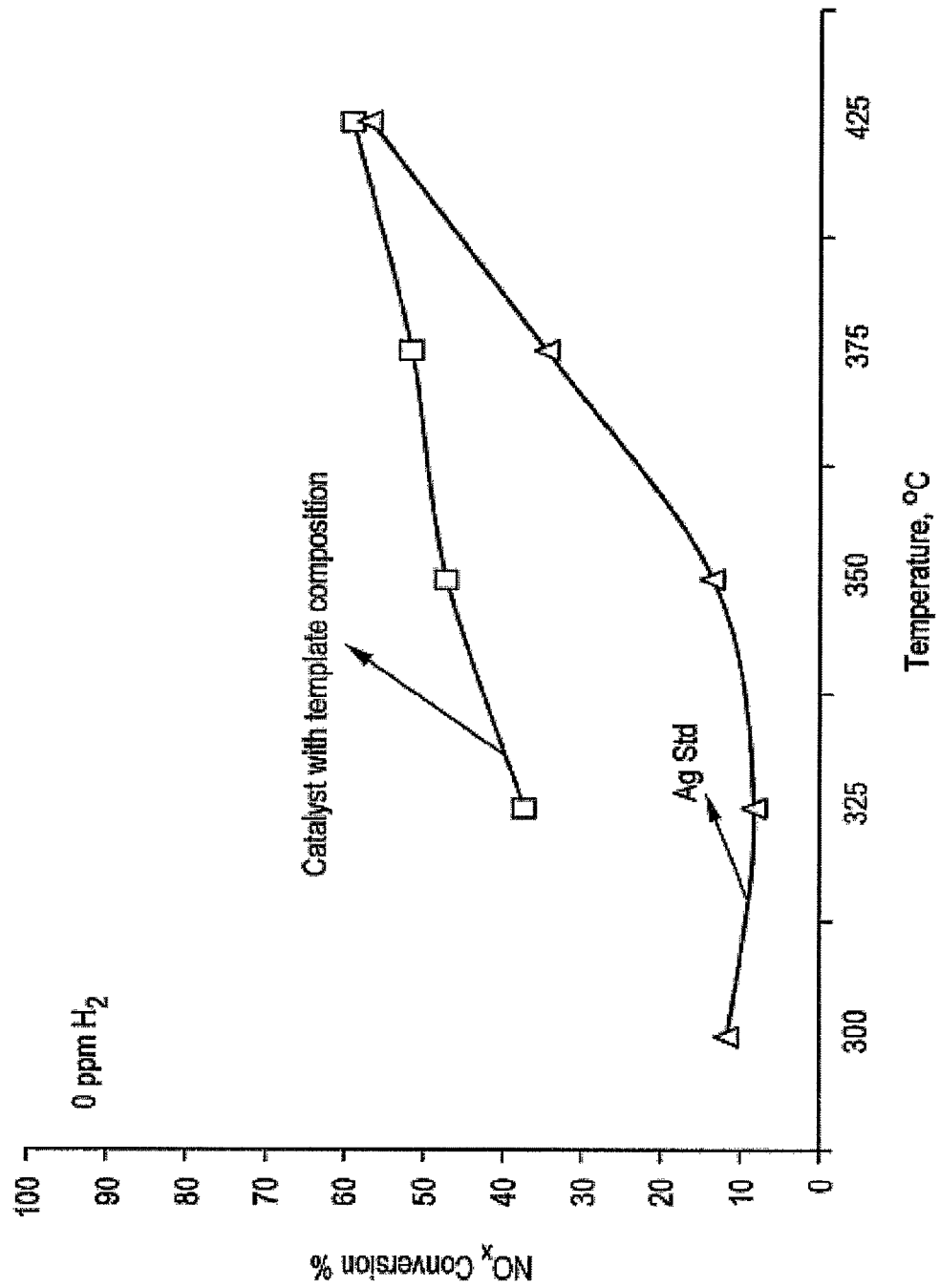
FIG. 1 is a graph showing the NOx conversion at temperatures of 300 to 425° C. with ULSD.

This invention includes embodiments that may relate to catalysts. This invention includes embodiments that may relate to methods of making catalysts. This invention includes embodiments that may relate to articles that include catalysts.

As used herein, without further qualifiers mesoporous refers to a material containing pores with diameters in a range of from about 2 nanometers to about 50 nanometers. A catalyst is a substance that can cause a change in the rate of a chemical reaction without itself being consumed in the reaction. A slurry is a mixture of a liquid and finely divided particles. A sol is a colloidal solution. A powder is a substance including finely dispersed solid particles. Templating refers to a controlled patterning; and, templated refers to determined control of an imposed pattern and may include molecular self-assembly. A monolith may be a ceramic block having a number of channels, and may be made by extrusion of clay, binders and additives that are pushed through a dye to create a structure. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

Disclosed herein is a catalyst composition for reducing NOx that is present in an exhaust gas stream including emissions generated from combustion in furnaces, ovens, and engines. The catalyst composition includes a catalytic metal disposed on a substrate. When the catalyst composition is employed to reduce NOx generated in emissions from furnaces, ovens and engines, a variety of hydrocarbons can be effectively used as a reductant. In an exemplary embodiment, diesel can be used as a reductant.

Suitable catalyst compositions disclosed herein may be manufactured from a reactive solution that includes a substrate precursor, a solvent, a modifier, and a suitable templating agent. A suitable substrate precursor may include an inorganic alkoxide. During preparation, the reactive solution is gelled and calcined to produce the substrate. A catalytic metal may be impregnated into the gel or into the substrate to produce the catalyst composition. The use of the templating agent in the reactive solution controls pore formation in the substrate.

Suitable catalytic composition may include a catalytic metal. Suitable catalytic metals may include one or more alkali metals, alkaline earth metals, transition metals, and main group metals. Examples of suitable catalytic metals are silver, platinum, gold, palladium, iron, nickel, cobalt, gallium, indium, ruthenium, rhodium, osmium, and iridium. In one embodiment, the catalytic metal may include a combination of two or more of the foregoing metals. An exemplary catalytic metal is silver.

An average catalytic composition particle size is less than about 100 nanometers. In one embodiment, the average catalytic composition particle size is in a range of from about 0.1 nanometers to about 1 nanometer, from about 1 nanometer to about 5 nanometers, from about 5 nanometers to about 15 nanometers, from about 15 nanometers to about 25 nanometers, from about 25 nanometers to about 50 nanometers, or greater than about 50 nanometers.

The catalytic metals may be present in the catalyst composition in an amount greater than about 0.025 mole percent. The amount selection may be based on end use parameters, economic considerations, desired efficacy, and the like. In one embodiment, the amount is in a range of from about 0.025 mole percent to about 0.2 mole percent, from about 0.2 mole percent to about 1 mole percent, from about 1 mole percent to about 5 mole percent, from about 5 mole percent to about 10 mole percent, from about 10 mole percent to about 25 mole percent, from about 25 mole percent to about 35 mole percent, from about 35 mole percent to about 45 mole percent, from about 45 mole percent to about 50 mole percent, or greater than about 50 mole percent. An exemplary amount of catalytic metal in the catalyst composition is about 1.5 mole percent to about 5 mole percent.

The substrate may include an inorganic material. Suitable inorganic materials may include, for example, inorganic oxides, inorganic carbides, inorganic nitrides, inorganic hydroxides, inorganic oxides, inorganic carbonitrides, inorganic oxynitrides, inorganic borides, or inorganic borocarbides. In one embodiment, the inorganic oxide may have hydroxide coatings. In one embodiment, the inorganic oxide may be a metal oxide. The metal oxide may have a hydroxide coating. Other suitable metal inorganics may include one or more metal carbides, metal nitrides, metal hydroxides, metal carbonitrides, metal oxynitrides, metal borides, or metal borocarbides. Metallic cations used in the foregoing inorganic materials can be transition metals, alkali metals, alkaline earth metals, rare earth metals, or the like.

Examples of suitable inorganic oxides include silica ($SiO_2$), alumina ($Al_2O_3$), titania ($TiO_2$), zirconia ($ZrO_2$), ceria ($CeO_2$), manganese oxide ($MnO_2$), zinc oxide (ZnO), iron oxides (e.g., FeO, $\beta\text{-}Fe_2O_3$, $\gamma\text{-}Fe_2O_3$, $\beta\text{-}Fe_2O_3$, $Fe_3O_4$, or the like), calcium oxide (CaO), and manganese dioxide ($MnO_2$ and $Mn_3O_4$). Examples of suitable inorganic carbides include silicon carbide (SiC), titanium carbide (TiC), tantalum carbide (TaC), tungsten carbide (WC), hafnium carbide (HfC), or the like. Examples of suitable nitrides include silicon nitrides ($Si_3N_4$), titanium nitride (TiN), or the like. Examples of suitable borides include lanthanum boride ($LaB_6$), chromium borides (CrB and $CrB_2$), molybdenum borides ($MoB_2$, $Mo_2B_5$ and MoB), tungsten boride ($W_2B_5$), or the like. An exemplary inorganic substrate is alumina. The alumina may be crystalline or amorphous.

As noted above, the substrate is porous. In one embodiment, the average pore size of the substrate is controlled and selected to reduce or eliminate poisoning. Poisoning may affect catalytic ability, and may be by aromatic species present in the reductant or in the exhaust gas stream.

The substrate may be mesoporous and have average diameters of pore greater than about 2 nanometers. In one embodiment, the substrate may have average pores sizes in a range of from about 2 nanometers to about 3 nanometers, from about 3 nanometers to about 5 nanometers, from about 5 nanometers to about 7 nanometers, from about 7 nanometers to about 10 nanometers, from about 10 nanometers to about 15 nanometers, from about 15 nanometers to about 17 nanometers, from about 17 nanometers to about 20 nanometers, from about 20 nanometers to about 25 nanometers, from about 25 nanometers to about 30 nanometers, from about 30 nanometers to about 35 nanometers, from about 35 nanometers to about 45 nanometers, from about 45 nanometers to about 50 nanometers, or greater than about 50 nanometers. The average pore size may be measured using nitrogen measurements (BET). An exemplary substrate is a mesoporous substrate. BET theory is a rule for the physical adsorption of gas molecules on a solid surface and serves as the basis for an important analysis technique for the measurement of the specific surface area of a material.

The pore size may have a narrow monomodal distribution. In one embodiment, the pores have a pore size distribution polydispersity index that is less than about 1.5, less than about 1.3, or less than about 1.1. In one embodiment, the distribution in diameter sizes may be bimodal, or multimodal. The porous materials may be manufactured via a templating process, which will be described below.

The pores may be distributed in a controlled and repeating fashion to form a pattern. In one embodiment, the pore arrangement is regular and not random. The pores may be ordered and may have an average periodicity. The average pore spacing may be controlled and selected based on the surfactant selection that is used during the gelation. In one embodiment, the pores are unidirectional, are periodically spaced, and have an average periodicity. One porous substrate has pores that have a spacing of greater than about 20 Angstroms (Å). In one embodiment, the spacing is in a range of from about 20 Å to about 40 Å, from about 40 Å to about 50, from about 50 Å to about 100 Å, from about 100 Å to about 150 Å, from about 150 Å to about 200 Å, from about 200 Å to about 250 Å, from about 250 Å to about 300 Å, or greater than about 300 Å. The average pore spacing (periodicity) may be measured using small angle X-ray scattering.

The porous substrate may have a surface area greater than about $0.5 \text{ m}^2/\text{gram}$. In one embodiment, the surface area is in a range of from about $0.5 \text{ m}^2/\text{gram}$ to about $10 \text{ m}^2/\text{gram}$, from about $10 \text{ m}^2/\text{gram}$ to about $100 \text{ m}^2/\text{gram}$, from about $100 \text{ m}^2/\text{gram}$ to about $200 \text{ m}^2/\text{gram}$, or from about $200 \text{ m}^2/\text{gram}$ to about $1200 \text{ m}^2/\text{gram}$. In one embodiment, the porous substrate has a surface area that is in a range from about $0.5 \text{ m}^2/\text{gram}$ to about $200 \text{ m}^2/\text{gram}$. In one embodiment, the porous substrate has a surface area in a range of from about $200 \text{ m}^2/\text{gram}$ to about $250 \text{ m}^2/\text{gm}$, from about $250 \text{ m}^2/\text{gram}$ to about $500 \text{ m}^2/\text{gm}$, from about $500 \text{ m}^2/\text{gram}$ to about $750 \text{ m}^2/\text{gm}$, from about $750 \text{ m}^2/\text{gram}$ to about $1000 \text{ m}^2/\text{gm}$, from about $1000 \text{ m}^2/\text{gram}$ to about $1250 \text{ m}^2/\text{gm}$, from about 1250 m²/gram to about 1500 m²/gm, from about 1500 m²/gram to about 1750 m²/gm, from about 1750 m²/gram to about 2000 m²/gm, or greater than about 2000 m²/gm.

The porous substrate may be present in the catalyst composition in an amount that is greater than about 50 mole percent. In one embodiment, the amount present is in a range of from about 50 mole percent to about 60 mole percent, from about 60 mole percent to about 70 mole percent, from about 70 mole percent to about 80 mole percent, from about 80 mole percent to about 90 mole percent, from about 90 mole percent to about 95 mole percent, from about 95 mole percent to about 98 mole percent, from about 98 mole percent to about 99 mole percent, from about 99 mole percent to about 99.9975 mole percent, of the catalyst composition.

In one method of manufacturing, the catalyst composition and a reactive solution is mixed in a vessel with a suitable solvent, a modifier, and a suitable templating agent. The substrate precursor is selected as an inorganic alkoxide. The reactive solution includes a substrate precursor, which is initially in the form of a sol, and is converted to a gel by the sol gel process. A catalytic metal salt may be impregnated into the gel by incipient wetness impregnation. The gel is filtered, washed, dried and calcined to yield a solid catalyst composition that includes the catalytic metal disposed on a porous substrate. During the calcination process, the metal salt may be reduced to a catalytic metal.

In one embodiment, the catalytic metal salt may be a part of the reactive solution. The sol can include the reactive metal salt prior to gelation. After gelation, the gel is filtered, washed, dried and calcined to yield a catalyst composition that includes the catalytic metal disposed on a porous substrate. During the calcination process, the metal salt is reduced to a metal.

In one embodiment, the gel may be subjected to supercritical extraction in order to produce the porous substrate. Carbon dioxide can be used as the supercritical fluid to facilitate the supercritical extraction.

The calcination is conducted at temperatures in a range of from about 350° C. to about 400° C., from about 400° C. to about 500° C., from about 500° C. to about 600° C., from about 600° C. to about 700° C., or from about 700° C. to about 800° C. In one embodiment, the calcination is conducted at a temperature of about 550° C. The calcination may be conducted for a time period of from about 10 minutes to about 30 minutes, from about 30 minutes to about 60 minutes, from about 60 minutes to about 1 hour, from about 1 hour to about 10 hours, from about 10 hours to about 24 hours, or from about 24 hours to about 48 hours.

In one method of manufacturing the catalyst composition, a reactive solution includes a substrate precursor and is mixed in a vessel with a suitable solvent, a modifier, and a suitable templating agent. The substrate precursor may include an inorganic alkoxide. The reactive solution may be in the form of a sol, and may convert to a gel by the sol gel process. The gel is calcined to form a solid. The solid is coated with a solution of a metal salt to form a washcoated substrate. The solution of the metal salt includes a metal salt and a solvent. Suitable metal salts and solvents are listed below. The coating process may include dip coating, spin coating, centrifuging, spray coating, painting by hand or by electrostatic spray painting, or the like.

The washcoated substrate is subjected to the calcination process listed above, to reduce the metal salt to a metal and to form the catalyst composition. The calcination process is conducted at the temperatures and for the times listed above.

Suitable inorganic alkoxides may include one or more of tetraethyl orthosilicate, tetramethyl orthosilicate, aluminum isopropoxide, aluminum tributoxide, aluminum ethoxide, aluminum-tri-sec-butoxide, aluminum tert-butoxide, antimony (III) ethoxide, antimony (III) isopropoxide, antimony (III) methoxide, antimony (III) propoxide, barium isopropoxide, calcium isopropoxide, calcium methoxide, chloro triisopropoxy titanium, magnesium di-tert-butoxide, magnesium ethoxide, magnesium methoxide, strontium isopropoxide, tantalum (V) butoxide, tantalum (V) ethoxide, tantalum (V) ethoxide, tantalum (V) methoxide, tin (IV) tert-butoxide, diisopropoxytitanium bis(acetylacetonate) solution, titanium (IV) (triethanolaminato) isopropoxide solution, titanium (IV) 2-ethylhexyloxide, titanium (IV) bis (ethyl acetoacetato) diisopropoxide, titanium (IV) butoxide, titanium (IV) butoxide, titanium (IV) diisopropoxide bis(2,2, 6,6-tetramethyl-3,5-heptanedionate), titanium (IV) ethoxide, titanium (IV) isopropoxide, titanium (IV) methoxide, titanium (IV) tert-butoxide, vanadium (V) oxytriethoxide, vanadium (V) oxytriisopropoxide, yttrium (III) butoxide, yttrium (III) isopropoxide, zirconium (IV) bis(diethyl citrato) dipropoxide, zirconium (IV) butoxide, zirconium (IV) diisopropoxidebis (2,2,6,6-tetramethyl-3,5-heptanedionate), zirconium (IV) ethoxide, zirconium (IV) isopropoxide zirconium (IV) tert-butoxide, zirconium (IV) tert-butoxide, or the like. An exemplary inorganic alkoxide is aluminum sec-butoxide.

The reactive solution contains an inorganic alkoxide in an amount greater than about 1 weight percent based on the weight of the reactive solution. In one embodiment, the reactive solution contains an inorganic alkoxide in an amount in a range of from about 1 weight percent to about 5 weight percent, from about 5 weight percent to about 10 weight percent, from about 10 weight percent to about 15 weight percent, from about 15 weight percent to about 20 weight percent, from about 20 weight percent to about 30 weight percent, from about 30 weight percent to about 40 weight percent, from about 40 weight percent to about 50 weight percent, or greater than about 50 weight percent.

Suitable solvents include aprotic polar solvents, polar protic solvents, and non-polar solvents. Suitable aprotic polar solvents may include propylene carbonate, ethylene carbonate, butyrolactone, acetonitrile, benzonitrile, nitromethane, nitrobenzene, sulfolane, dimethylformamide, N-methylpyrrolidone, or the like. Suitable polar protic solvents may include water, nitromethane, acetonitrile, and short chain alcohols. Suitable short chain alcohols may include one or more of methanol, ethanol, propanol, isopropanol, butanol, or the like. Suitable non polar solvents may include benzene, toluene, methylene chloride, carbon tetrachloride, hexane, diethyl ether, or tetrahydrofuran. Co-solvents may also be used. Ionic liquids may be used as solvents during gelation. Exemplary solvents include 2-butanol and 2-propanol.

Solvents may be present in an amount greater than about 0.5 weight percent. In one embodiment, the amount of solvent present may be in a range of from about 0.5 weight percent to about 1 weight percent, from about 1 to about 20 weight percent, from about 20 weight percent to about 50 weight percent, from about 50 weight percent to about 100 weight percent, from about 100 weight percent to about 200 weight percent, from about 200 weight percent to about 300 weight percent, from about 300 weight percent to about 400 weight percent, from about 400 weight percent to about 500 weight percent, from about 500 weight percent to about 600 weight percent, from about 600 weight percent to about 700 weight percent, from about 700 weight percent to about 800 weight percent, or greater than about 800 weight percent, based on the total weight of the reactive solution. Selection of the type and amount of solvent may affect or control the amount of porosity generated in the catalyst composition, as well as affect or control other pore characteristics.

Modifiers may be used to control hydrolysis kinetics of the inorganic alkoxides. Suitable modifiers may include one or more ethyl acetoacetate (EA), ethylene glycol (EG), triethanolamine (TA), or the like. In one embodiment, the reactive solution contains a modifier in an amount greater than about 0.1 weight percent, based on the weight of the reactive solution. In one embodiment, the amount of modifier present may be in a range of from about 0.1 weight percent to about 1 weight percent, from about 1 weight percent to about 2 weight percent, from about 2 weight percent to about 3 weight percent, from about 3 weight percent to about 4 weight percent, from about 4 weight percent to about 5 weight percent, or greater than about 5 weight percent.

The templating agents serve as templates and may facilitate the production of substrates containing directionally aligned tubular meso-channel forms, or pores. Control of the pore characteristic may, in turn, provide control of the particle size of catalytic metal by reducing the catalytic metal lability or propensity to agglomerate. The particle size of catalytic metal may be controlled, with respect to pore formation of the porous template, by controlling or affecting one or more of pore size, pore distribution, pore spacing, or pore dispersity.

The reactive solution may include the templating agent in an amount greater than about 0.1 weight percent, based on the weight of the reactive solution. In one embodiment, the templating agent amount is present in a range of from about 0.01 weight percent to about 0.2 weight percent, from about 0.2 weight percent to about 1 weight percent, from about 1 weight percent to about 5 weight percent, from about 5 weight percent to about 10 weight percent, from about 10 weight percent to about 25 weight percent, from about 25 weight percent to about 35 weight percent, from about 35 weight percent to about 45 weight percent, from about 45 weight percent to about 50 weight percent, or greater than about 50 weight percent. An exemplary amount of templating agent based on the weight of the reactive solution is about 1.5 weight percent to about 5 weight percent.

Selection of the type(s) and amounts of the templating agent may affect or control the pore characteristics of the resultant templated substrate. Suitable templating agents may include one or more surfactants. Suitable surfactants may include cationic surfactants, anionic surfactants, non-ionic surfactants, or Zwitterionic surfactants. In one embodiment, the templating agent may include one or more cyclic species. Examples of such cyclic species may include cyclodextrin and crown ether.

Suitable cationic surfactants may include cetyltrimethyl ammonium bromide (CTAB), cetylpyridinium chloride (CPC), polyethoxylated tallow amine (POEA), benzalkonium chloride (BAC), and benzethonium chloride (BZT). Other suitable cationic surfactants may include those having a chemical structure denoted by $CH_3(CH_2)_{15}N(CH_3)_3$—Br, $CH_3 (CH_2)_{15}$—$(PEO)_n$—OH where n=2 to 20 and where PEO is polyethylene oxide, $CH_3 (CH_2)_{14}COOH$ and $CH_3(CH_2)_{15}NH_2$. Other suitable cationic surfactants may include one or more fluorocarbon surfactants, such as $C_3F_7O(CFCF_3CF_2O)_2CFCF_3$—$CONH(CH_2)_3N(C_2H_5)_2CH_3I)$ commercially available as FC-4.

Suitable anionic surfactants may include one or more of sodium dodecyl sulfate (SDS), ammonium lauryl sulfate, alkyl sulfate salts, sodium laureth sulfate also known as sodium lauryl ether sulfate (SLES), alkyl benzene sulfonate, soaps, fatty acid salts, or sodium dioctyl sulfonate (AOT). Suitable Zwitterionic surfactants may include dodecyl betaine, dodecyl dimethylamine oxide, cocamidopropyl betaine, or coco ampho-glycinate.

Nonionic surfactants may have polyethylene oxide molecules as hydrophilic groups. Suitable ionic surfactants may include alkyl poly(ethylene oxide), copolymers of poly(ethylene oxide) and polypropylene oxide) commercially called Poloxamers or Poloxamines and commercially available under the trade name PLURONICS. Examples of copolymers of poly (ethylene oxide) are $(EO)_{19}(PO)_{39}(EO)_{11}$, $(EO)_{20}(PO)_{69}(EO)_{20}$, $(EO)_{13}(PO)_{30}(EO)_{13}$, poly(isobutylene)-block-poly (ethylene oxide), poly (styrene)-block-poly (ethylene oxide) diblock copolymers, and block copolymer hexyl-oligo (p-phenylene ethynylene)-poly (ethylene oxide). Additional examples for copolymers of poly(ethylene oxide) are shown in the FIG. 1.

Suitable non-ionic surfactants may include one or more alkyl polyglucosides, octylphenol ethoxylate, decyl maltoside, fatty alcohols, cetyl alcohol, oleyl alcohol, cocamide monoethanolamine, cocamide diethanolamine, cocamide triethanolamine, 4-(1,1,3,3-tetramethyl butyl)phenyl-poly (ethylene glycol), polysorbitan monooleate, or amphiphilic poly (phenylene ethylene) (PPE). Suitable poly glucosides may include octyl glucoside. Other suitable non-ionic surfactants may include long-chain alkyl amines, such as primary alkylamines and N,N-dimethyl alkylamines. Suitable primary alkylamines may include dodecylamine and hexadecylamine. Suitable N,N-dimethyl alkylamines may include N,N-dimethyl dodecylamine or N,N-dimethyl hexadecylamine.

In one embodiment, the templating agent may include cyclodextrin. Cyclodextrins may include cyclic oligosaccharides that include 5 or more α-D-glucopyranoside units linked 1 to 4, as in amylose (a fragment of starch). Suitable cyclodextrins in the templating agent may include 5-membered to about 150-membered cyclic oligosaccharides. Exemplary cyclodextrins include a number of glucose monomers ranging from six to eight units in a ring. Suitable cyclodextrins are α-cyclodextrin, a six membered sugar ring molecule; β-cyclodextrin, a seven sugar ring molecule; γ-cyclodextrin, an eight sugar ring molecule; or the like.

As noted above, the templating agent can include crown ethers. Crown ethers are heterocyclic chemical compounds that include a ring containing several ether groups. Suitable crown ethers may include oligomers of ethylene oxide, the repeating unit being ethyleneoxy, i.e., —$CH_2CH_2O$—. Useful members of this series may include the tetramer (n=4), the pentamer (n=5), and the hexamer (n=6). Crown ethers derived from catechol may be used in the templating agent. Crown ethers that strongly bind certain types of cations to form complexes may be included in the templating agents. The oxygen atoms in the crown ether may coordinate with a cation located at the interior of the ring, whereas the exterior of the ring may be hydrophobic. For example, 18-crown-6 has high affinity for potassium cation, 15-crown-5 for sodium cation, and 12-crown-4 for lithium cation.

Suitable metal salts may include the salts of transition metals. In one embodiment, metal salts may include one or more metals selected from silver, platinum, gold, palladium, iron, nickel, cobalt, or the like. Suitable salts may include halides, sulfates, nitrates, sulfides, or the like. An exemplary salt is silver nitrate.

The metal salt may be present in the reactive solution in an amount greater than about 0.1 weight percent, based on the total weight of the reactive solution. In one embodiment, the metal salt is present in an amount that is in a range of from about 0.01 weight percent to about 0.2 weight percent, from about 0.2 weight percent to about 1 weight percent, from about 1 weight percent to about 5 weight percent, from about 5 weight percent to about 10 weight percent, from about 10 weight percent to about 25 weight percent, from about 25 weight percent to about 35 weight percent, from about 35 weight percent to about 45 weight percent, from about 45 weight percent to about 50 weight percent, or greater than about 50 weight percent. An exemplary amount of metal salt in the reactive solution is about 1.5 weight percent to about 5 weight percent.

The catalyst composition may be manufactured in powdered form. The catalyst composition may be manufactured in the form of a monolith. In one embodiment, the catalyst composition may be disposed on a prefabricated monolithic core. The prefabricated monolith core with the catalyst composition disposed thereon may be subjected to freeze drying as well as to calcining to produce a monolithic catalyst composition. In one embodiment, the prefabricated monolith core with the catalyst composition disposed thereon may be subjected to supercritical fluid extraction and to calcining to produce a monolithic catalyst composition.

After formation, the catalyst composition may be disposed in an exhaust gas stream of an automobile or a locomotive having NOx therein. The catalyst composition contacts and reduces NOx to nitrogen. The catalyst may be disposed into the exhaust gas stream either in powdered form or in the form of a monolith.

EXAMPLES

The following examples illustrate methods and embodiments in accordance with the invention, and as such should not be construed as imposing limitations upon the claims. These examples demonstrate the manufacture of the catalyst compositions described herein and demonstrate their performance compared with other catalyst compositions that are commercially available. Unless specified otherwise, all components are commercially available from common chemical suppliers such as Alpha Aesar, Inc. (Ward Hill, Mass.), Spectrum Chemical Mfg. Corp. (Gardena, Calif.), and the like.

Example 1

Manufacture of a Catalyst Composition

The catalyst composition is designated as Sample Ag-(TX-114). An amount of TRITON X-114 surfactant serves as the templating agent. The catalyst composition is manufactured by making a first solution, a second solution and a third solution, which are mixed together.

The first solution includes ethyl acetoacetate (26.5 g, 0.2 mol), TRITON X-114 (139 g) and 2-butanol (500 mL). These are combined in a 5-L, 3-neck flask equipped with an addition funnel, a condenser, and a mechanical stirrer. The second solution includes aluminum sec-butoxide (Al(O$^{sec}$Bu)$_3$) (500 g, 2 mol) and 2-butanol (2 L)). The second solution is added to the first solution with stirring and held at an ambient temperature for 30 minutes. The third solution includes water (75 mL, 4 mol), AgNO$_3$ (10.2 g, 60 mmol) and 2-butanol (950 mL) and is added to the first and second solutions via the addition funnel over a period of about 90 minutes. The solutions are heated at ambient temperature for about 3 hours. Then, the contents are heated to about reflux for 20 hours to 24 hours.

The contents cool and are filtered using a #50 paper filter and washed with ethanol. The obtained white solid is dried in under vacuum. A vacuum oven is used at 80° C. under standard vacuum. The solid is subjected to Soxhlet extraction with ethanol for 20 hours to 24 hours. The solid is dried in a vacuum oven at 80° C. to yield 164 grams of reaction product. The dry reaction product is heated under a flow of nitrogen in a tube furnace from room temperature to 550° C. at a heating rate of 2° C./minute. Once achieved, the temperature is maintained at 550° C. for 1 hour. Afterward, the reaction product is calcined in a flow of air at 550° C. for 5 hours to produce a substrate. This washcoating of the substrate is as described below.

A catalyst containing 2 mole percent Ag on Norton alumina is called AgSTD and is present as a control. The impregnated materials are dried in a vacuum oven at 80° C. and calcined in air at 600° C. for 6 hours in a box furnace. The prepared catalysts for each sample, above, are weighed out (~50 mg) and placed in 2 ml GC vials until use in a reactor. The exact weight of each catalyst is measured using a BOHDAN weighing robot.

Example 2

Performance of Catalyst Compositions

This example compares conversion performance of NOx contained in an exhaust gas streams for samples that include embodiments of the invention relative to comparative catalyst compositions. The comparative catalyst compositions do not contain substrates manufactured using a templating agent. This example demonstrates that the catalyst composition can be manufactured and used in the form of a monolith.

The water-based sol obtained from the synthesis as described in Example 1 was processed in a way conducive for washcoating. The aqueous sol was poured in a freeze-drying pan that was filled with liquid N$_2$. The sol instantly froze forming porous foam. In order to ensure the sol does not melt during drying, the freeze-dryer was pre-frozen to −55° C. The freeze-dryer was slowly heated from −55° C. to +30° C. with 2 h isothermal hold after every 5° C. A pressure of 300 mTorr was maintained during the drying cycle. The resulting PSD after drying is shown in Table 1. The powder after freeze-drying was small enough to be directly washcoated on a monolith.

TABLE 1

| PSD of powder that was rapidly quenched with liquid N$_2$ and freeze-dried: | |
|---|---|
| | Freeze-dried powder (microns) |
| d90 | 39.6 |
| d50 | 12.6 |
| d10 | 4.1 |

The freeze-dried powder was slurried in water (12 wt. %) and further ultrasonically milled for 10 mins before washcoating.

The ultrasonic milled powder was subjected to Soxhlet extraction with ethanol for 24 hours, and oven-vacuum drying at 30 mmHg for 24 hours to obtain a solid. 50-75% of the surfactant was removed during this step.

A monolith core (¾" i.d., SICAS) is immersed for 30 seconds in slurry that is continuously being agitated. Next, excess slurry from the monolith is removed by blowing compressed air using an air knife for 20 seconds. Finally, the wet monolith is dried using hot air at 80° C. and calcined at 550° C. for 4 hrs.

To manufacture the comparative composition, SBA 200 alumina is disposed on a SICAS monolithic core. An amount of 2 weight percent silver is disposed on the SICAS monolithic core that contained the SBA 200 alumina. Both catalysts are tested using the simulated exhaust gas stream (300 ppm NO, 7% H2O, 12% O2, 0 ppm SO2, space velocity=30,000 hr-1, 0 ppm H2, 1700 ppm Cl-ULSD). The simulated exhaust gas stream contains an exhaust gas composition and a reductant. The reductant is ULSD fuel. The results are shown in the FIG. 1. FIG. 1 is a graph showing the NOx conversion at temperatures of 300° C. to 425° C.

With reference to FIG. 1, the sample manufactured according to an embodiment of the invention shows relatively better NOx conversion results over a relatively wider temperature range relative to the comparative composition (designated as—Ag Std). In FIG. 18, the NOx conversion for the inventive Samples is in a range of from about 38 percent to about 60 percent.

The catalyst composition may reduce more than about 30 percent of the NOx present in an exhaust gas stream under determined use conditions. In one embodiment, the amount of reduction is at least about 10 percent, at least about 20 percent, or at least about 30 percent relatively more NOx reduced than other comparative catalyst compositions. In addition, the catalytic performance may be available over a temperature range of from about 200° C. to about 500° C. The catalyst composition may reduce NOx while using reductants that contain aromatic species or hydrocarbon species that on the average have less than four carbon atoms per molecule such as diesel.

With regard to the term reaction product, reference is made to substances, components, or ingredients in existence at the time just before first contacted, formed in situ, blended, or mixed with one or more other substances, components, or ingredients in accordance with the present disclosure. A substance, component or ingredient identified as a reaction product may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product.

All ranges disclosed herein are inclusive of the endpoints, and the endpoints are combinable with each other. The terms "first," "second," and the like as used herein do not denote any order, quantity, or importance, but rather are used to distinguish one element from another. The use of the terms "a" and "an" and "the" and similar referents in the context of describing the invention (especially in the context of the following claims) are to be construed to cover both the singular and the plural, unless otherwise indicated herein or contradicted by context.

$SO_2$ Aging Testing

Samples of the above described catalyst compositions for a metallic (namely, silver, Ag) catalyst secured to an alumina templated substrate were tested to determine the effect of sulfur dioxide ($SO_2$) aging on the catalysts and to determine the recovery of the $SO_2$ aged catalysts after thermal desulfation and ultra-light sulfur diesel (ULSD) aided desulfation. More specifically, 3% (molar) Ag templated alumina (AgTA) catalyst samples and 6% (molar) AgTA catalyst samples were tested. The samples were hydrothermally aged to replicate an accelerated aging of the samples. The hydrothermal aging was conducted over time intervals totaling about five hundred (500) hours, and tested. More specifically, the samples were heated to 600° C. for five hundred (500) hours with 9% $H_2O$ and a balance of air. These samples were tested and NOx conversion rates compared to the same samples after $SO_2$ aging as described in more detail below.

In addition, the hydrothermally aged monoliths (3% AgTA, and 6% AgTA) were $SO_2$ aged in a bench scale reactor at 400° C. in the presence of reductant, and full simulated exhaust. The feed conditions of the simulated exhaust during aging consisted of 300 ppm NO, 7% $H_2O$, 12% $O_2$, 0 ppm CO, 1 ppm $SO_2$ and 1700 ppm ULSD (ultra low sulfur diesel) with or without 1000 ppm $H_2$.

The reactor configuration for these experiments included a selective catalytic reductive (SCR) catalyst in the form of a 1" long monolith core (¾" id). A diesel oxidation catalyst (DOC) comprising $Pt/Al_2O_3$ catalyst beads was placed downstream of the SCR to oxidize any secondary emissions formed on the SCR catalyst (i.e. hydrocarbon slip, or N containing intermediates). The temperature of DOC catalyst was kept constant at 550° C. during the tests. The simulated exhaust for testing NOx conversion of the hydrothermally and $SO_2$ aged samples consisted of: 300 ppm NO; 7% $H_2O$; 12% $O_2$; balance $N_2$. The space velocity was 30,000 $hr^{-1}$ (3.1 SLPM total flow), and 50,000 $hr^{-1}$ (5.1 SLPM total flow), respectively. Reductants were ULSD or ULSD/$H_2$. A target reductant dosage was 1800 ppm $C_1$ ($C_1$:NO=6), with and without 1000 ppm $H_2$. The term $C_1$ is refers to or is indicative of the number of carbon atoms per million molecules in the exhaust mixture. The simulated exhaust stream was passed through an oxidative catalyst prior to testing the sample in order to oxidize the reductant (ULSD) to $CO_2$ to estimate a concentration of carbon atoms.

The reactor was brought to 450° C. until it was stable then ULSD was injected for 4 hours. The catalyst was tested at 450, 400, 350, and 300° C. for 1 hour each. Then the diesel injection was stopped and the catalyst was brought back to 450° C. The test was repeated with ULSD and 1000 ppm $H_2$ in the stream.

Figure 2:
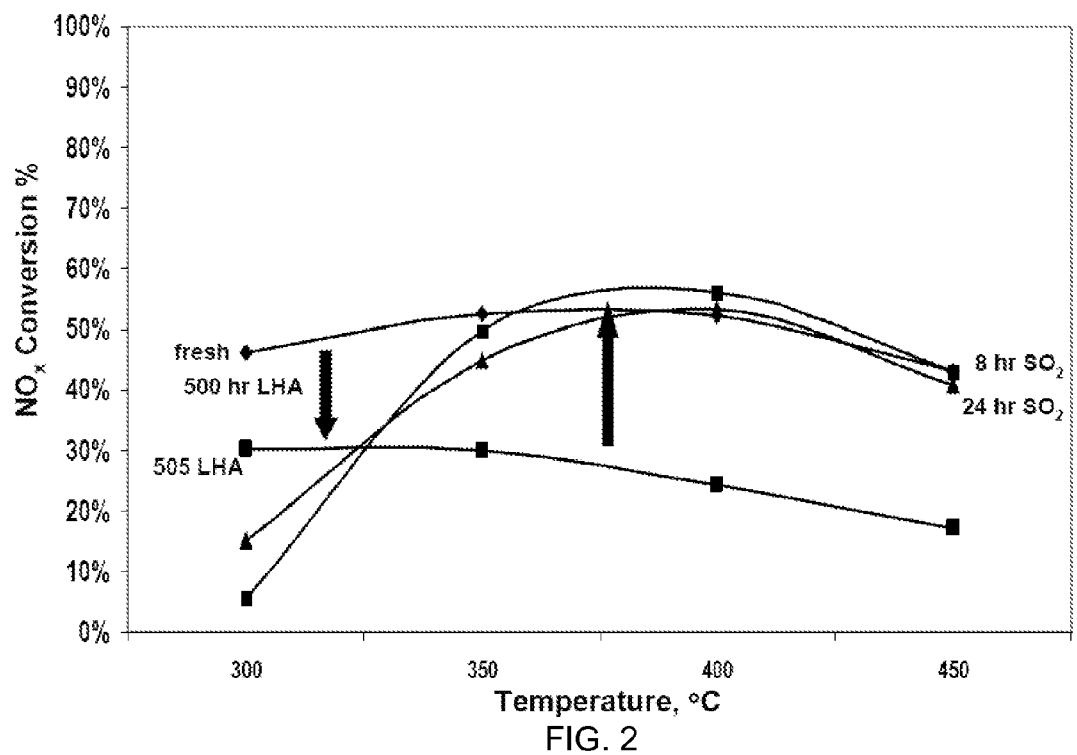
FIG. 2 is a graph showing the NOx conversion for fresh, hydrothermally aged and $SO_2$ aged 6% AgTA catalytic compositions with ULSD and $H_2$.

With respect to FIG. 2, there is illustrated a graph setting forth NOx conversion percentages versus temperature. Tests results, shown as the diamond marked line, for a fresh 6% AgTA catalyst, not having been hydrothermally aged or SO2 treated, show a NOx conversion rate of between 45% to 50% at temperatures ranging 300° C. to about 450° C. The same sample was then hydrothermally aged as described above.

The test results, represented by the line labeled LHA (lean hydrothermal aging), show a marked reduced conversion NOx for the same range of temperatures. However eight (8) hours of SO2 (1 ppm) aging improved the performance of the hydrothermally aged material with ULSD/H2 reductants at temperatures between 350-450° C. Additional SO2 aging for up to 24 hrs did not significantly affect the performance, as shown in FIG. 2. Note, that at temperatures from about 300-350° C. the performance of the catalyst is negatively impacted by the SO2 aging.

Figure 3:
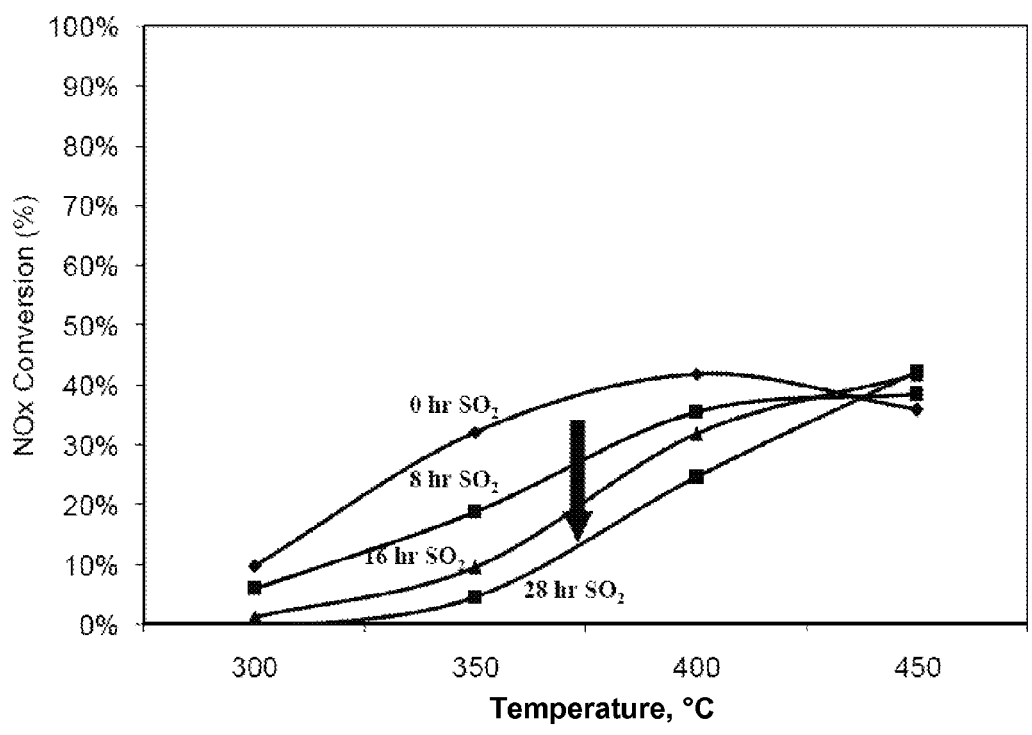
FIG. 3 is a graph showing the NOx conversion for hydrothermally and $SO_2$ aged 3% AgTA catalytic compositions with ULSD.
Figure 4:
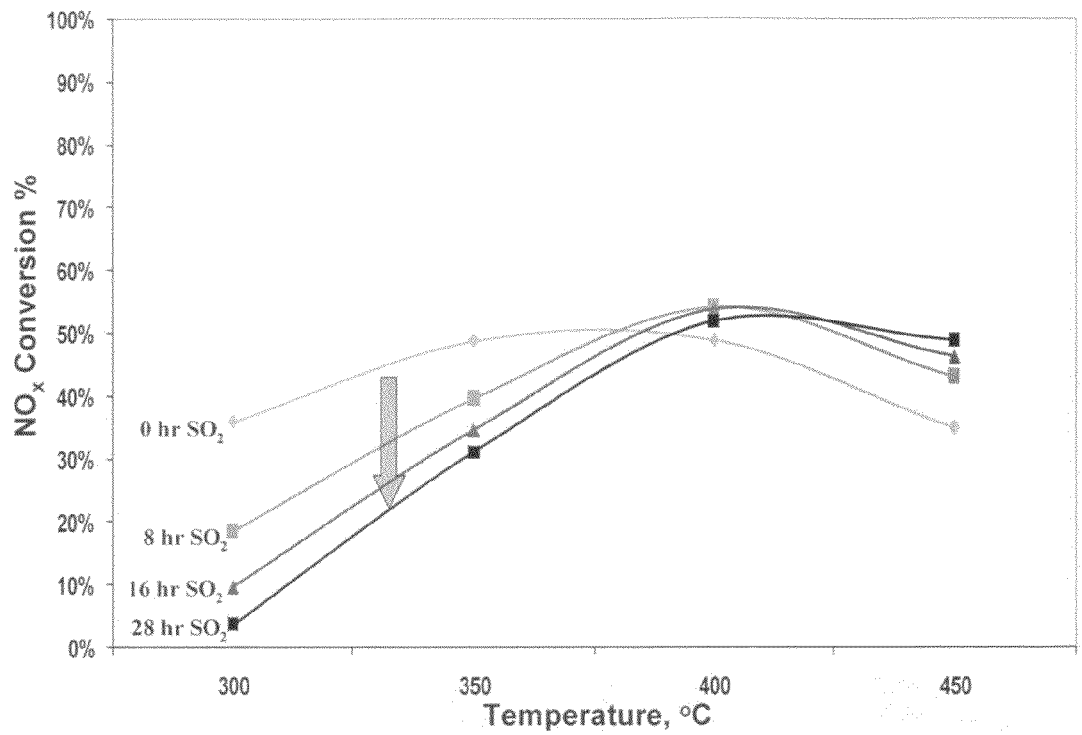
FIG. 4 is a graph showing the NOx conversion for hydrothermally and $SO_2$ aged 3% AgTA catalytic compositions with ULSD and $H_2$.

Similar tests were performed for the hydrothermally aged 3% AgTA. As shown in FIG. 3, this composition is less SO2 tolerant than 6% AgTA, as its performance progressively degrades upon SO2 exposure. The 3% AgTA was SO2 treated for 8, 16 and 24 hours in the presence of ULSD. Thus, the effect of SO2 on the performance of the AgTA catalyst, and above-described catalytic composition, is strongly dependent on the Ag loading. While 6% Ag showed improved performance upon mild SO2 treatment, the 3% AgTA is very sensitive to the amount of SO2 exposure. However, as shown in the graph of FIG. 4, the addition of H2 (1,000 ppm) minimizes this effect at temperatures higher than 350° C. The 3% AgTA sample represented by the test results in FIG. 4 was subject to the above-described SO2 treatment for 8, 16 and 28 hours, in the presence of ULSD and H2.

Thermal DeSulfation Testing

Figure 5:
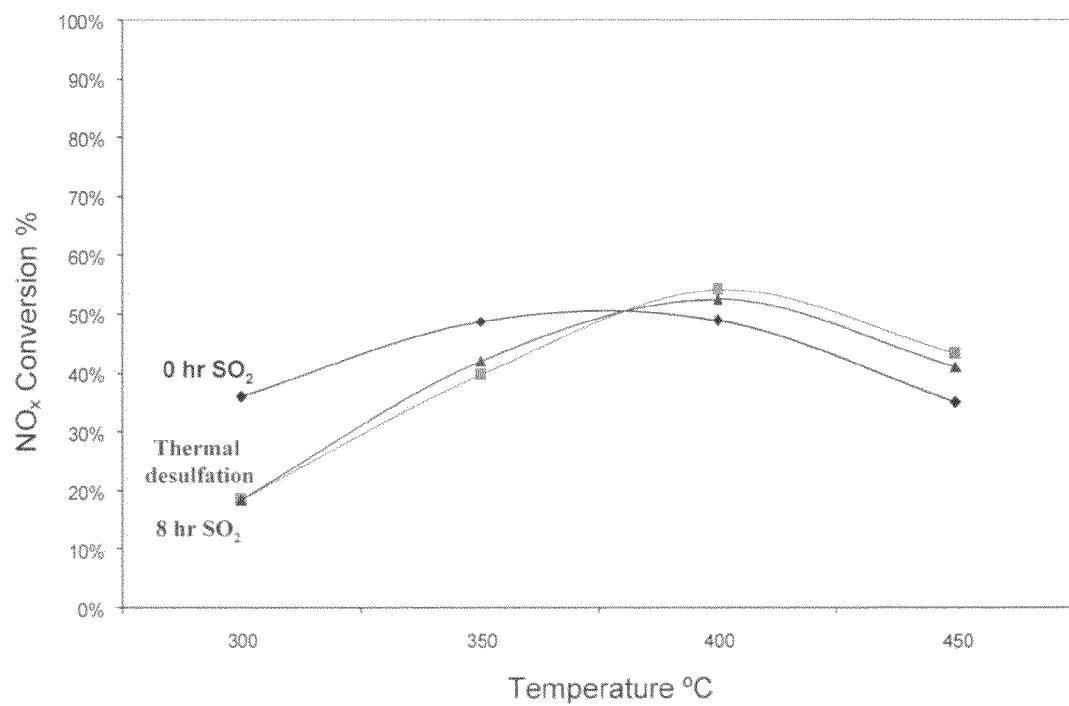
FIG. 5 is a graph showing the NOx conversion for hydrothermally and $SO_2$ aged 6% AgTA catalytic compositions with ULSD and $H_2$ and such compositions having been thermally desulfated.

In view of the above test results of the hydrothermally and SO2 aged catalytic compositions desulfation strategies were tested to improve the performance of the catalytic compositions. A typical on-road after-treatment system consists of a diesel particulate filter (DPF) followed by a SCR catalyst. SCR catalyst will experience periodic high temperature excursions during the active DPF regeneration events. Therefore, it is desired that the SCR desulfation process occurs while the DPF is de-coked at elevated temperatures. To test this hypothesis, a 3% AgTA catalyst was thermally desulfated. With respect to FIG. 5, the sample was subjected to an 8 hour SO2 aging; and as similarly shown in FIGS. 2 and 3, the 3% AgTA was sensitive to the SO2 aging process at temperatures below 350° C. to about 400° C. As represented by the triangle-marked line (also labeled "thermal desulfation) in FIG. 5, no change in performance was noted upon the high temperature treatment, indicating that these conditions are not sufficient to recover the catalyst performance.

Desulfation chemistry of the AgTA catalyst involves a reducing step of the sulfated species formed on the alumina support, and/or Ag particles. That is the sulfated species deposited on the catalytic composition including the Ag catalyst and alumina substrate renders the Ag less oxidative negatively impacting the catalysts composition effectiveness in reducing NOx. Accordingly, desulfation testing was conducted with the injection of ultra-light sulfur diesel ("ULSD"), at high temperatures, to potentially accelerate this reduction process.

Figure 6:
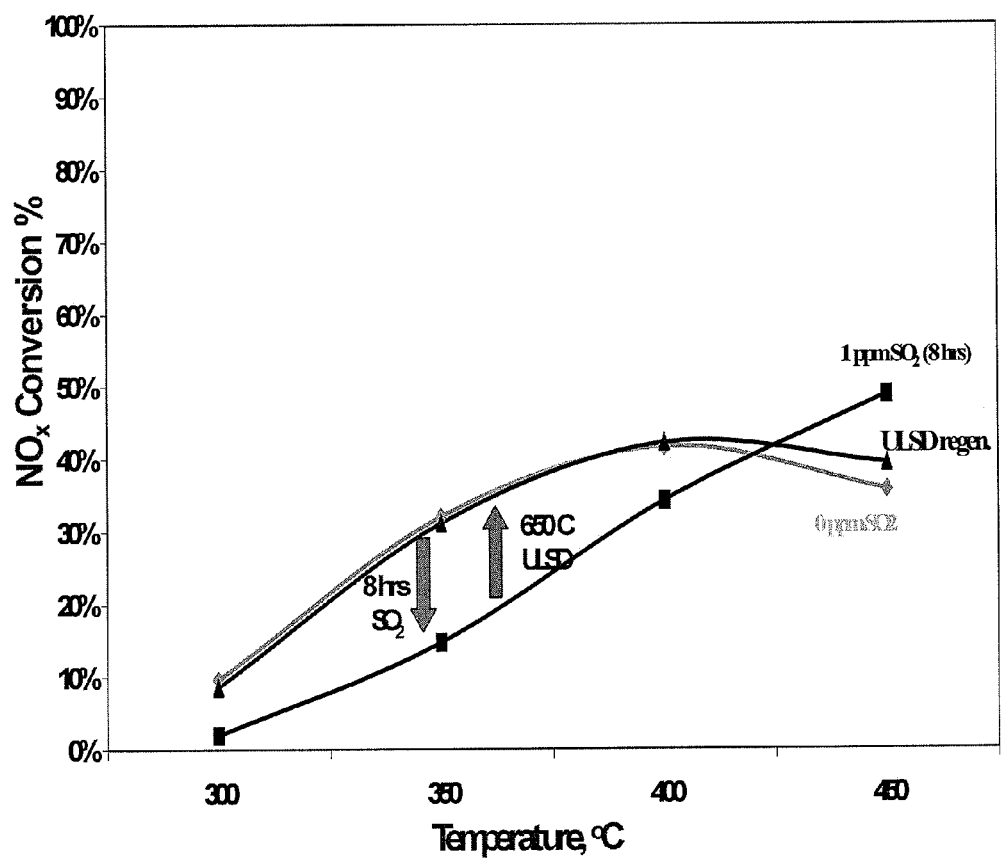
FIG. 6 is a graph showing the NOx conversion for hydrothermally and $SO_2$ aged 3% AgTA catalytic compositions with ULSD and $H_2$ and such compositions having been ULSD desulfated.

A 3% AgTA catalyst sample, having been hydrothermally and SO2 aged as described above, was desulfated at 650 C, with a desulfation composition injected and comprising 12% O2, 7% H2 and 2,500 ppm ULSD, for 8 hrs. As shown in FIG. 6, and as represented by the line marked with triangles (also labeled "ULSD regen"), the thermal treatment in the presence of ULSD, did recover the performance of the catalyst before the SO2 treatment. The test sample had first been hydrothermally aged at 600° C. with an exhaust including 9% H2O at different time intervals totaling about 500 hours. The sample was then tested for NOx conversion under the following exhaust feed conditions: 300 ppm NO, 7% H2O, 12% O2, 1,000 H2, 1,700 ppm C1 (ULSD) with a balance of N2. The space velocity was 30,000 hr−1 (3.1 SLPM total flow), and 50,000 hr−1 (5.1 SLPM total flow), respectively. As shown in FIG. 6, NOx conversion improved at temperatures above 400° C.

Figures 7C, 7D:
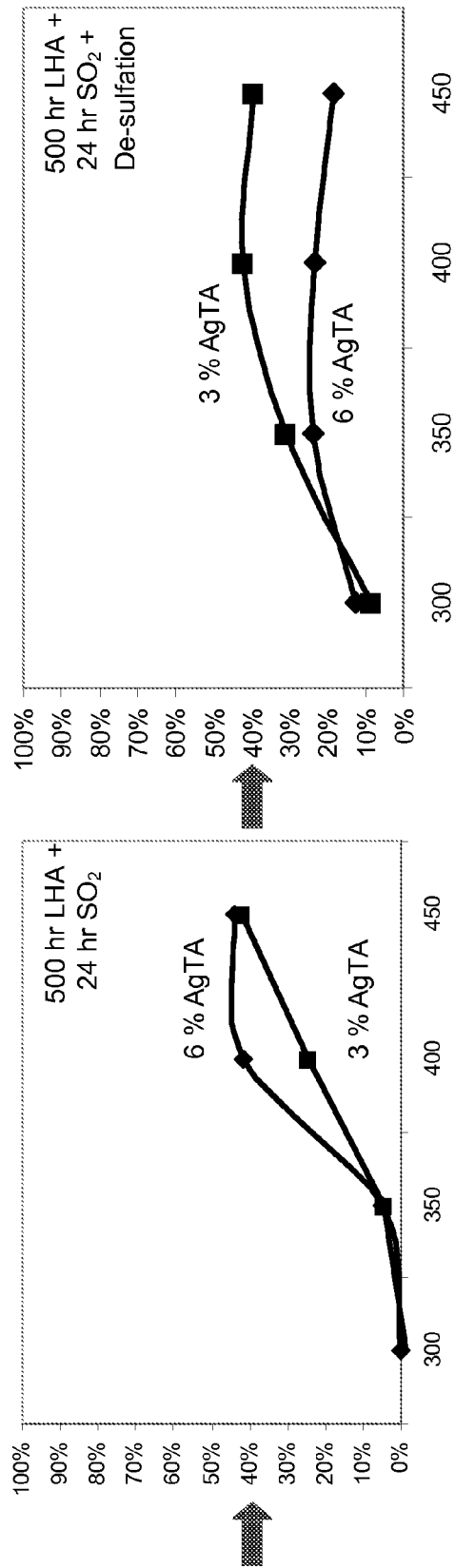
FIG. 7C is a graph comparing the NOx conversion of hydrothermally and $SO_2$ (for 24 hours) aged 3% and 6% AgTA catalytic compositions with ULSD.
FIG. 7D is a graph comparing the NOx conversion of hydrothermally and $SO_2$ (for 24 hours) aged 3% and 6% AgTA catalytic compositions with ULSD having been ULSD desulfated and further demonstrating the recovery of the catalytic compositions.

The test results demonstrated that the 3% AgTA catalyst is more hydrothermally stable, exhibits better fresh performance, and is less SO2 resistant than the 6% AgTA catalyst. ULSD-assisted thermal de-sulfation proved to be efficient in recovering the initial performance of the SO2-treated 3% AgTA catalyst. A summary of the performance evaluation of the aged catalysts is shown in FIGS. 7A through 7D. FIG. 7A represents the performance of the 3% and 6% AgTA samples tested after a lean hydrothermal aging conducted as described above. In comparison, FIGS. 7B and 7C represent NOx conversion of each of 3% and 6% AgTA samples after having been subjected to hydrothermal aging and then to 8 and 24 hour SO2 treatments respectively. As shown, the 3% AgTA catalyst is more sensitive to the SO2 treatment compared to the 6% AgTA catalyst. However, as shown in FIG. 7D, both the 3% and 6% AgTA performances were recovered after thermal desulfation in the presence of ULSD. In addition, in reference to the graph shown in FIG. 5, the performance of the SO2-treated materials is improved by addition of H2, as a co-reductant, and/or by utilizing a lighter fraction of ULSD.

Figure 8:
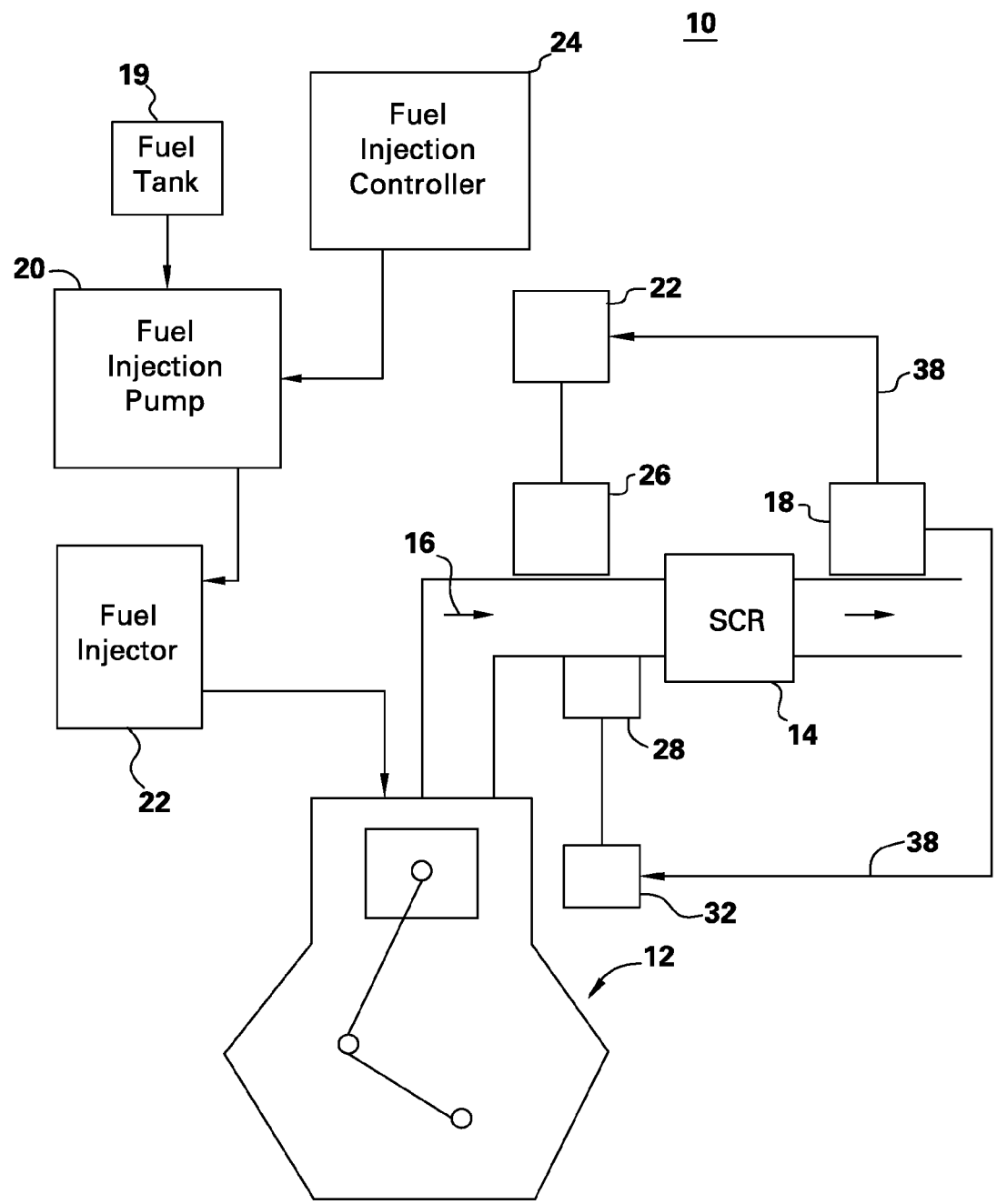
FIG. 8 is a schematic illustration of an embodiment of a system for controlling NOx emissions.

In an embodiment of a NOx reduction system 10 for an internal combustion engine 12 that incorporates any of the above-described catalytic compositions (including combinations thereof or similar such compositions), as shown in FIG. 8, the catalytic converter 14 or selective catalytic reducing catalyst (SCR) is provided downstream of the exhaust stream 16 from the internal combustion engine 12. The catalytic converter 14 may comprise multiple converters arranged in series. For a typical internal combustion engine 12, fuel from a fuel tank 19 is provided to a fuel pump 20. Injection of fuel into cylinders (not shown) of the engine 12 is controlled by a fuel injection controller 24 and fuel injectors 26. As noted a catalytic converter (SCR) 14 is provided downstream from the engine 12 for conversion of nitrous oxide emissions. A heat source 26 and a fuel injection mechanism 28 are provided upstream relative to the catalytic converter 14 to heat the exhaust stream 16 and introduce a regeneration fuel into the exhaust stream 16, respectively, for desulfation of the catalytic converter 14.

One or more controllers 30 and 32 may be provided to control the heat source 26 and fuel injection mechanism 28. In an embodiment, the controllers 30 and 32 may be configured to heat the exhaust stream 16 and inject the regeneration fuel at timed intervals over a resident time period. For example, the controllers 30 and 32 may be programmed to initiate a desulfation after the catalytic converter 14 has been in operation over a predetermined amount of time. Then the heat source 26 and fuel injection mechanism 28 may be activated by controllers 30 and 32 respectively at predetermined times. For example, after the converter 14 has been in operation for 500 hours, desulfation may be performed every other hour for a five (5) minute resident time period whereby the heat source 26 heats exhaust stream for the resident time and the fuel injection mechanism 28 injects the regeneration fuel into the exhaust stream 16.

The regeneration fuel may be any one or combination of, but not limited to, diesel fuel, ultra low sulfur diesel, gasoline, kerosene, ethanol, biodiesel etc. The regeneration fuel may be provided from the fuel tank 19, or another onboard tank in fluid communication with the fuel injection mechanism 28. In addition, the system 10 includes appropriate pumps and controls so that the regeneration fuel is delivered to the exhaust stream 16 under pressure.

The amount of regeneration fuel necessary to perform a desulfation procedure at a predetermined temperature, or temperature range, may vary according to certain parameters such as the composition of air/fuel in the exhaust 16 and the composition of the catalytic converter 14. In an embodiment, the internal combustion engine 12 is a lean burn engine in which the air ratio λ of the exhaust lean air/fuel mixture greater than 1. A sufficient amount of the regeneration fuel is injected during the resident time so that the air ratio λ of the exhaust lean air/fuel mixture remains above 1. That is during desulfation the injection of the regeneration fuel does not alter the air/fuel mixture in the exhaust to a "rich" air/fuel mixture. In an embodiment, the heat source 26 may heat the exhaust stream 16 to about 650° C. and enough regeneration fuel is injected so the exhaust composition includes at least about 1700 ppm of fuel.

In an embodiment, one or more detectors 18 (shown in FIGS. 8 and 9) may be provided that monitor parameters that under certain conditions indicate desulfation of the converter 14 is necessary. For example, a detector 18, for detecting the level of NOx emissions of the exhaust stream 16, is positioned downstream from the converter 14 to detect the level of NOx emissions in exhaust stream exiting the converter 14. The detector 18 transmits signals 38 to the controllers 30 and 32. The signals 38 indicate or represent the level of NOx emissions in the exhaust stream 16 essentially monitoring the performance of the converter 14. Depending on the type of detector 18, the signals 38 may indicate more or less information as required. For example, the signals 38 may indicate a specific concentration or range of concentrations of NOx; or, the signals 38 may indicate that the NOx concentration has exceeded a predetermined level thereby indicating that the converter must be regenerated. In such a case, the controllers 30 and 32 may be configured to initiate a desulfation procedure.

Detectors may be provided to detect parameters in addition to, or other than NOx emissions. For example, detectors may be provided to detect the sulfur content of the exhaust downstream from the converter 14, wherein sulfur detection levels being too low may indicate sulfur species are deposited on the converter 14 and desulfation is required. Temperature detectors may be provided to detect the temperature of the exhaust downstream of the converter 14 to indicate if desulfation is required.

Figure 9:
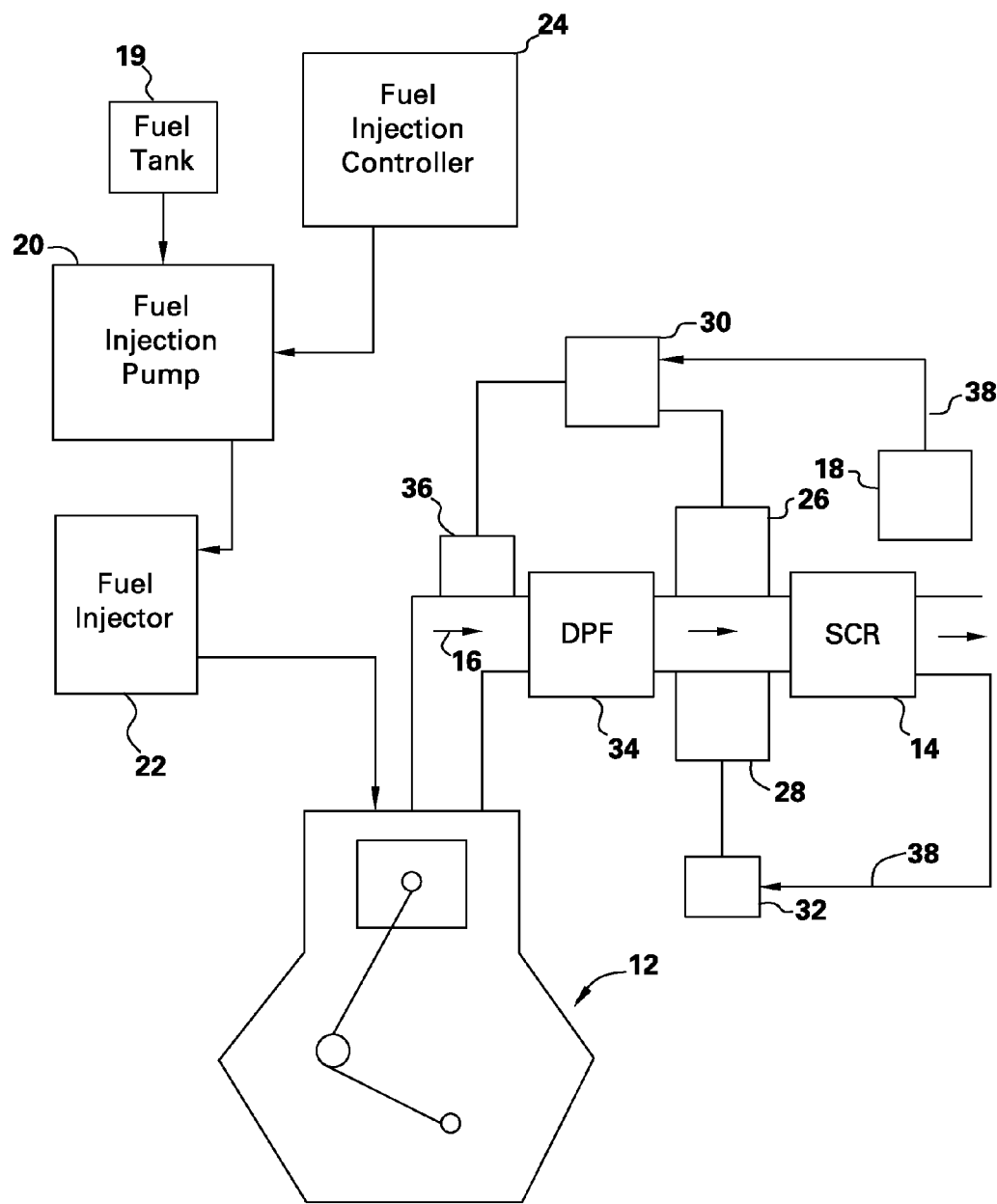
FIG. 9 is a schematic illustration of another embodiment of a system for controlling NOx emissions.

In an embodiment shown in FIG. 9, a diesel particulate filter (DPF) 34 is provided upstream relative to the converter 14, or between the engine 12 and the converter 14. The DPF 34 filters carbon deposits from the exhaust stream and collects "soot" and/or ash deposits; and, therefore may require regeneration during operation of the engine 12. The DPF 34 may include a passive regeneration system and/or may be actively regenerated using a heat source between the engine 12 and DPF 34. For example, a heat source 36 is provided upstream relative to the DPF 34, which may heat the exhaust stream 16 for active regeneration of the DPF 34 and/or for the desulfation of the converter 14. That is when the heat source 36 is activated to perform a regeneration of the DPF 34, the exhaust stream 16 may be heated to a temperature sufficient for desulfation of the converter 14. In such a case, the fuel injection mechanism 28 may be activated to perform desulfation at the same time the DPF 34 is being regenerated.

In addition to the heat source 36 for the DPF 34, the previously described heat source 26 (so only a single heat source 36 may be required) may be positioned between the DPF 34 and the converter 14; and, the controller 30 may be linked to both heat sources 36 and 26 to simultaneously, heat the DPF for regeneration and heat the converter 14 for desulfation. In addition, or alternatively, the heat source 36 may linked to a separate controller, or the controller 30 is configured to initiate DPF 34 regeneration at times when desulfation is not required and the fuel injection mechanism 28 is not activated. Either heat source 36 or 26 may be a burner-type source that requires fuel that can be provided by the fuel tank 19 or other onboard source that is dedicated to each heat source 26 and 36, or each may have its own dedicated fuel source.

In other embodiments, the DPF 34 may be positioned downstream relative to the catalytic converter 14 and the heat source 36 may be positioned between converter 14 and the DPF 34, if two heat sources are required. If only a single heat source is used then heat source 26 positioned upstream relative to the converter may be used to heat the exhaust for desulfation of the converter 14 and regeneration of the DPF 34.

In addition to the above described components, the system 10 may also include a diesel oxidation catalyst (DOC) that may be placed downstream of the converter 14. In an embodiment in which the DPF 34 is placed upstream or downstream from the converter 14, the DOC may be positioned upstream relative to the DPF 34.

Figure 10:
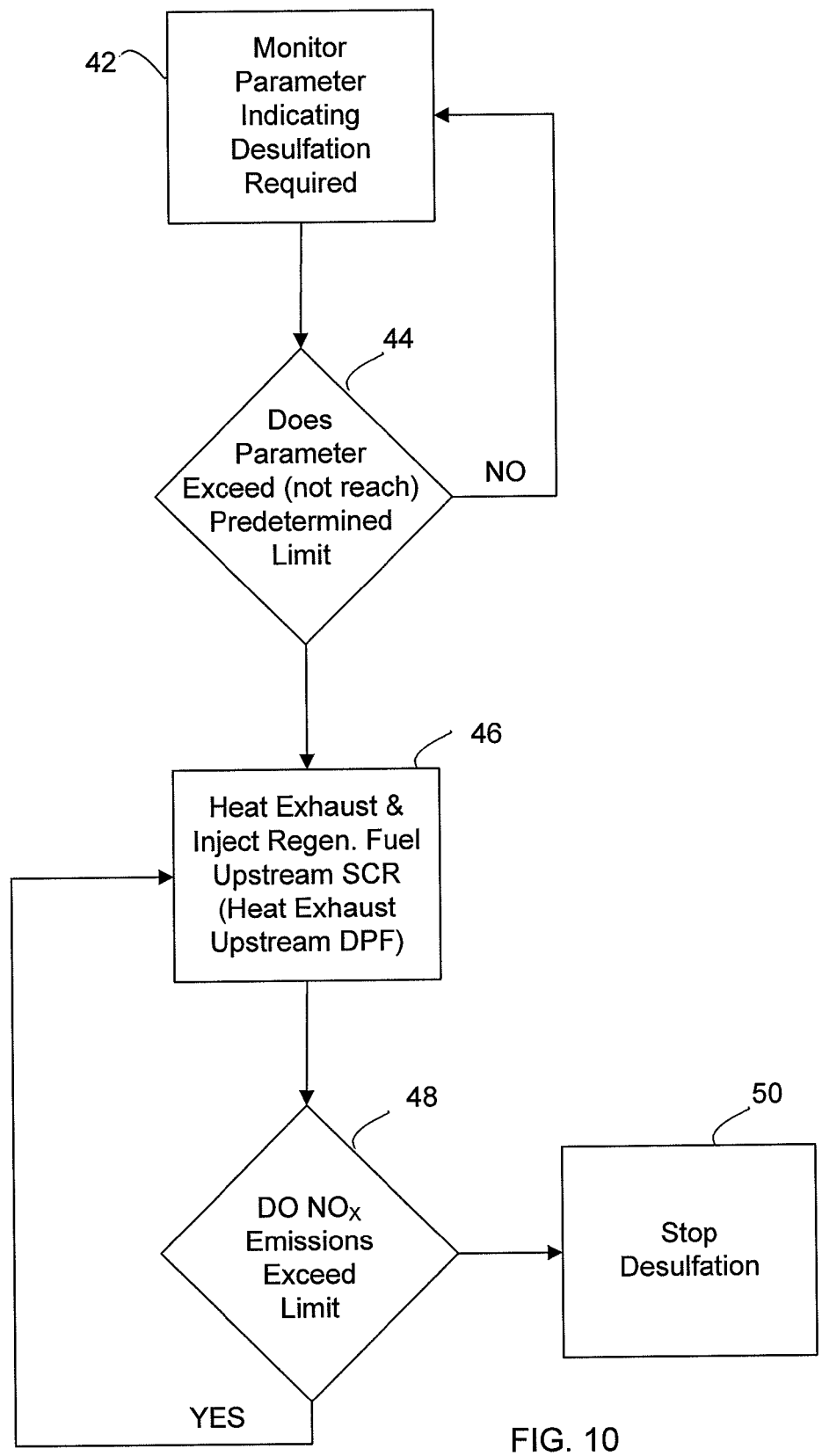
FIG. 10 is a flow chart regarding a method for controlling NOx emissions.

A method of performing desulfation of a converter or a method for controlling NOx emissions is set forth in the flow chart depicted in FIG. 10. In step 42 a detection means is provided downstream from the catalytic metal composition or converter 14 to monitor an operating parameter that indicates when desulfation of the converter 14 is required. As described above, the particular parameter may include one or more parameters such as NOx emissions from the converter 14, sulfur content of the exhaust downstream of the converter 14 or temperature of the exhaust stream. The invention is not limited to these parameters but may include monitoring any operating parameter that may provide an indicator that desulfation is required. However, as described above, a system may be provided that does not require the monitoring step 42 or below detecting step 44. That is, the system 10 (including controllers 30 and 32) may be configured to initiate a desulfation of the converter 14 at predetermined time intervals.

As shown in steps 42 and 44, when the monitored parameter (NOx emissions) is detected as exceeding a predetermined limit, or detected as not reaching a predetermined limit, a desulfation process is initiated 14. More specifically, in step 46 the exhaust is heated upstream relative to the converter 14. In addition, the regeneration fuel is introduced in the exhaust upstream relative to the converter. As also provided in step 46, in the case where a DPF 34 is provided between the engine 12 and converter 14, the exhaust may be heated upstream the DPF 34 for regeneration of the DPF 34. In such a case the regeneration fuel is introduced into the exhaust stream 16 between the DPF 34 and converter 14.

In an embodiment, in which detectors 18 are used to monitor the above-described operating parameters, in steps 48 and 50, desulfation continues (heating and injection of regeneration fuel) continues until the parameter falls below or reaches the predetermined limit and the desulfation process is stopped. For example, controllers 30 and 32 deactivate the heat source 26 (or 36) and the fuel injection mechanism 28.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of controlling nitrous oxide emissions in an exhaust emitted from a lean internal combustion engine that operates using fuel with a lean air/fuel mixture and produces a lean air/fuel mixture in the exhaust having an air/fuel ratio λ greater than 1, comprising:
providing a catalytic converter comprising a catalytic metal secured to a substrate that has templated pores within an exhaust stream produced by the internal combustion engine, wherein sulfur species from the exhaust deposit on the catalytic converter;
introducing into the exhaust stream, upstream from the catalytic converter a predetermined amount of a regeneration fuel for a resident time period in order to oxidize the sulfur species and de-sulfate the catalytic converter until the air/fuel ratio λ of the exhaust lean air/fuel mixture is greater than 1 after introduction of the regenerating fuel; and
heating the exhaust upstream relative to the catalytic converter to a temperature above a range of exhaust temperatures over which the internal combustion operates thereby heating the catalytic metal and the substrate.

2. The method of claim 1, further comprising providing a diesel particulate filter upstream or downstream relative to the catalytic converter.

3. The method of claim 2, further comprising regenerating the diesel particulate filter by heating the diesel particulate filter.

4. The method of claim 3, wherein the step of regenerating the diesel particulate filter comprises simultaneously introducing the regeneration fuel for desulfation of the catalytic converter and heating the catalytic converter.

5. The method of claim 4, wherein the step of regenerating the diesel particulate filter comprises heating the exhaust upstream relative to the diesel particulate filter.

6. The method of claim 1, wherein the regeneration fuel is one of diesel, ultra low sulfur diesel fuel, biodiesel, gasoline, kerosene, ethanol or any combination thereof.

7. The method of claim 6, wherein a sufficient amount of ultra low sulfur diesel is introduced so that the composition of exhaust includes more than about 1700 ppm of the ultra low sulfur diesel fuel.

8. The method of claim 1, wherein the step of heating the exhaust and the catalytic converter comprises heating the exhaust to a temperature of about 650° C.

9. The method of claim 1, further comprising the step of monitoring a parameter associated with the exhaust stream indicating that the catalytic converter needs to be desulfated.

10. The method of claim 9, wherein the monitoring step comprises monitoring the level of nitrous oxide emissions of the catalytic converter.

11. The method of claim 1, wherein the steps of introducing the regeneration fuel and heating the exhaust stream are performed at predetermined timed intervals.

12. The method of claim 1, wherein the steps of introducing the regeneration fuel and heating the exhaust stream are performed in response to detecting a parameter associated with the exhaust stream indicating that the catalytic converter requires desulfation.

13. A system for controlling nitrous oxide emissions exhausted from a lean burn internal combustion engine that produces a lean air/fuel mixture in an exhaust having an air/fuel ratio λ greater than 1, comprising:
a catalytic converter comprising a catalytic metal secured to a substrate that has templated pores that is positioned within an exhaust stream produced by the internal combustion engine and the catalytic converter is positioned downstream relative to the internal combustion engine and wherein sulfur species from the exhaust deposit on the catalytic converter;
an injector mechanism for introducing a regeneration fuel into the exhaust stream upstream relative to the catalytic converter to oxidize the sulfur species and de-sulfate the catalytic converter until the air/fuel ratio λ of the exhaust lean air/fuel mixture is greater than 1 after introduction of the regenerating fuel; and,
a heat source positioned upstream relative to the catalytic converter that is activated when the injector mechanism is introducing the regeneration fuel into the exhaust stream to heat the exhaust stream above a range of exhaust temperatures over which the internal combustion engine operates thereby heating the catalytic metal and the substrate.

14. The system of claim 13, further comprising a diesel particulate filter positioned in the exhaust stream upstream relative to the catalytic converter.

15. The system of claim 14, wherein the heat source is positioned upstream relative to the diesel particulate filter and the injector mechanism is positioned between the diesel particulate filter and the catalytic converter.

16. The system of claim 14, wherein the heat source is positioned between the diesel particulate filter.

17. The system of claim 15, wherein the heat source and injector mechanism are activated to simultaneously regenerate the diesel particulate filter and desulfate the catalytic converter.

18. The system of claim 13, further comprising one or more controllers for activating the heat source and the injector mechanism.

19. The system of claim 18, further comprising a detector for detecting an exhaust stream parameter indicating that the catalytic converter requires desulfation and the detector transmits signals indicative of the parameter wherein the controller activates the heat source and injector mechanism for desulfation of the catalytic converter responsive to signals indicating that desulfation is required.

20. The system of claim 13, wherein the heat source and the injector mechanism are activated at predetermined time intervals over a resident time period.

21. The system of claim 13, wherein the regeneration fuel is an ultra low sulfur diesel, ethanol, kerosene or gasoline or a combination thereof.

22. The system of claim 13, wherein the catalytic metal comprises silver, gold, palladium or platinum.

23. The system of claim 22, wherein the substrate comprises alumina.

24. The system of claim 13, wherein the pores are periodically spaced.

25. The system of claim 13, wherein the pores have a periodicity in a range from about 50 Angstrom to about 130 Angstrom.

26. The system of claim 13, wherein the pores have an average diameter of less than 50 nanometers.

27. A method for desulfating a catalytic converter comprising a catalytic metal secured to a substrate that has templated pores and is disposed in an exhaust stream downstream relative to a lean burn internal combustion engine that produces a lean air/fuel mixture in the exhaust having an air/fuel ratio $\lambda$ greater than 1, and wherein sulfur species from the exhaust deposit on the catalytic converter, the method comprising:

introducing into the exhaust stream, upstream from the catalytic converter a predetermined amount of a regeneration fuel for a resident time period in order to oxidize the sulfur species and de-sulfate the catalytic converter wherein the air/fuel ratio $\lambda$ of the exhaust lean air/fuel mixture does drop below 1 after introduction of the regenerating fuel, and heating the exhaust upstream relative to the catalytic converter to a temperature above a range of exhaust temperatures over which the internal combustion operates thereby heating the catalytic metal and the substrate.

28. The method of claim 27, further comprising providing a diesel particulate filter upstream or downstream relative to the catalytic converter.

29. The method of claim 28, further comprising regenerating the diesel particulate filter by heating the filter.

30. The method of claim 29, wherein the step of regenerating the diesel particulate filter, introducing the regeneration fuel for desulfation of the catalytic converter and heating the catalytic converter are performed simultaneously.

31. The method of claim 30, wherein the step of regenerating the diesel particulate filter comprises heating the exhaust upstream relative to the diesel particulate filter.

32. The method of claim 27, wherein the regeneration fuel is diesel, ultra low sulfur diesel fuel, biodiesel, gasoline, kerosene, ethanol or any combination thereof.

33. The method of claim 27, further comprising the step of monitoring a parameter associated with the exhaust stream indicating that the catalytic converter needs to be desulfated.

34. The method of claim 33, wherein the monitoring step comprises monitoring the level of nitrous oxide emissions of the catalytic converter.

* * * * *